United States Patent
Walters

(10) Patent No.: US 9,640,283 B2
(45) Date of Patent: *May 2, 2017

(54) SMALL, FAST NEUTRON SPECTRUM NUCLEAR POWER PLANT WITH A LONG REFUELING INTERVAL

(71) Applicant: Advanced Reactor Concepts LLC, Reston, VA (US)

(72) Inventor: Leon C. Walters, Idaho Falls, ID (US)

(73) Assignee: Advanced Reactor Concepts LLC, Chevy Chase, MD (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/291,890

(22) Filed: May 30, 2014

(65) Prior Publication Data
US 2014/0321590 A1    Oct. 30, 2014

Related U.S. Application Data

(63) Continuation of application No. 13/030,740, filed on Feb. 18, 2011, now Pat. No. 8,767,902.
(Continued)

(51) Int. Cl.
*G21C 1/02* (2006.01)
*G21C 9/027* (2006.01)
(Continued)

(52) U.S. Cl.
CPC .............. *G21C 1/02* (2013.01); *G21C 5/06* (2013.01); *G21C 7/08* (2013.01); *G21C 9/027* (2013.01);
(Continued)

(58) Field of Classification Search
CPC . G21C 1/02; G21C 1/028; G21C 7/06; G21C 7/08; G21C 9/02; G21C 9/027;
(Continued)

(56) References Cited

U.S. PATENT DOCUMENTS 1,624,704 A    4/1927 Adams
2,983,663 A    5/1961 Bassett
(Continued)

FOREIGN PATENT DOCUMENTS

EA    010962    12/2008
GB    1206776 A    9/1970
(Continued)

OTHER PUBLICATIONS

Cha et al., "Development of a Supercritical CO2 Brayton Energy Conversion System Coupled with a Sodium Cooled Fast Reactor," Nuclear Engineering and Technology, [online] Oct. 2009: 41(8), pp. 1025-1044 [retrieved on Nov. 11, 2011] Retrieved from theInternet: <URL: http://article.nuclear.or.kr/jknsfile/v41/JK0411 025.pdf>.
(Continued)

*Primary Examiner* — Bernarr Gregory
(74) *Attorney, Agent, or Firm* — Porzio, Bromberg & Newman P.C.

(57) ABSTRACT

Nuclear reactor systems and methods are described having many unique features tailored to address the special conditions and needs of emerging markets. The fast neutron spectrum nuclear reactor system may include a reactor having a reactor tank. A reactor core may be located within the reactor tank. The reactor core may include a fuel column of metal or cermet fuel using liquid sodium as a heat transfer medium. A pump may circulate the liquid sodium through a heat exchanger. The system may include a balance of plant with no nuclear safety function. The reactor may be modular, and may produce approximately 100 $MW_e$.

25 Claims, 5 Drawing Sheets

Related U.S. Application Data

(60) Provisional application No. 61/306,754, filed on Feb. 22, 2010.

(51) Int. Cl.
| | | |
|---|---|---|
| *G21C 19/20* | (2006.01) | |
| *G21C 7/08* | (2006.01) | |
| *G21C 5/06* | (2006.01) | |
| *G21C 1/00* | (2006.01) | |

(52) U.S. Cl.
CPC ............ *G21C 19/205* (2013.01); *Y02E 30/34* (2013.01); *Y02E 30/39* (2013.01)

(58) Field of Classification Search
CPC ........ G21C 19/20; G21C 19/205; G21C 5/02; G21C 5/06; Y02E 30/30; Y02E 20/34; Y02E 30/39; G21D 5/02
USPC ........ 148/400, 421; 60/643, 644.1; 376/156, 376/158, 170, 171, 174–179, 207, 210, 376/219–222, 260, 261, 264–267, 277, 376/298, 299, 302–304, 317, 320, 321, 376/323, 327, 328, 330, 347, 361–364, 376/366–380, 383, 391–394, 402–405
See application file for complete search history.

(56) References Cited

U.S. PATENT DOCUMENTS

| | | |
|---|---|---|
| 2,992,179 A | 7/1961 | Bassett |
| 3,042,594 A | 7/1962 | Hauth |
| 3,098,024 A | 7/1963 | Barney et al. |
| 3,178,354 A | 4/1965 | Vann et al. |
| 3,197,375 A | 7/1965 | Borst |
| 3,215,608 A | 11/1965 | Guenther |
| 3,243,352 A | 3/1966 | Boudouresques et al. |
| 3,261,378 A | 7/1966 | Ayer et al. |
| 3,322,509 A | 5/1967 | Vogg |
| 3,328,133 A | 6/1967 | Ishihara et al. |
| 3,372,213 A | 3/1968 | Nishiyama et al. |
| 3,409,973 A | 11/1968 | Kilp et al. |
| 3,413,383 A | 11/1968 | Hirose et al. |
| 3,420,738 A | 1/1969 | Grant |
| 3,442,762 A | 5/1969 | Denton |
| 3,677,894 A | 7/1972 | Ferrari |
| 3,682,774 A | 8/1972 | Beyer |
| 3,683,975 A | 8/1972 | Sease et al. |
| 3,702,282 A | 11/1972 | Gatley et al. |
| 3,708,393 A | 1/1973 | Waymire et al. |
| 3,778,348 A | 12/1973 | Sease et al. |
| 3,808,320 A | 4/1974 | Kaiser et al. |
| 3,823,067 A | 7/1974 | Stern et al. |
| 3,939,039 A | 2/1976 | Seki et al. |
| 4,000,617 A | 1/1977 | Fortescue |
| 4,004,972 A | 1/1977 | Mogard |
| 4,050,638 A | 9/1977 | Ito et al. |
| 4,057,465 A | 11/1977 | Thompson et al. |
| 4,131,511 A | 12/1978 | Mordarski et al. |
| 4,147,590 A | 4/1979 | Szekely |
| 4,225,560 A | 9/1980 | Nakanishi et al. |
| 4,229,942 A | 10/1980 | Gomberg et al. |
| 4,257,846 A | 3/1981 | Pierce |
| 4,257,847 A | 3/1981 | Gibby et al. |
| 4,292,127 A | 9/1981 | Hartley et al. |
| RE31,697 E | 10/1984 | Gomberg et al. |
| 4,526,741 A | 7/1985 | Cawley et al. |
| 4,548,347 A | 10/1985 | Christiansen et al. |
| 4,610,842 A | 9/1986 | Vannesjo |
| 4,624,828 A | 11/1986 | Alexander |
| 4,687,605 A | 8/1987 | Cellier et al. |
| 4,687,629 A | 8/1987 | Mildrum |
| 4,717,534 A | 1/1988 | Morita |
| 4,759,911 A | 7/1988 | Bingham et al. |
| 4,814,046 A | 3/1989 | Johnson et al. |
| 4,853,177 A | 8/1989 | Pettus |
| H689 H | 10/1989 | Christiansen et al. |
| 4,943,409 A | 7/1990 | Broadley |
| 4,971,753 A | 11/1990 | Taylor, Jr. et al. |
| 4,997,596 A | 3/1991 | Proebstle et al. |
| 5,044,911 A | 9/1991 | Seidel et al. |
| 5,112,534 A | 5/1992 | Guon et al. |
| 5,196,159 A | 3/1993 | Kawashima et al. |
| 5,219,519 A | 6/1993 | Matzner |
| 5,257,659 A | 11/1993 | Maag |
| 5,317,611 A | 5/1994 | Petrosky et al. |
| 5,377,246 A | 12/1994 | Taylor, Jr. et al. |
| 5,400,375 A | 3/1995 | Suzuki et al. |
| 5,419,886 A | 5/1995 | Grantham et al. |
| 5,446,773 A | 8/1995 | Wakabayashi |
| 5,502,754 A | 3/1996 | Erbes |
| 5,517,541 A | 5/1996 | Rosenbaum |
| 5,519,748 A | 5/1996 | Adamson et al. |
| 5,608,768 A | 3/1997 | Matzner et al. |
| 5,681,404 A | 10/1997 | Adamson et al. |
| 5,711,826 A | 1/1998 | Nordstrom |
| 5,742,653 A | 4/1998 | Erbes et al. |
| 5,828,715 A | 10/1998 | Kurosaki et al. |
| 6,091,791 A | 7/2000 | Matsumoto et al. |
| 6,113,982 A | 9/2000 | Claar et al. |
| 6,233,298 B1 | 5/2001 | Bowman |
| 6,251,310 B1 | 6/2001 | Song et al. |
| 6,263,038 B1 | 7/2001 | Kantrowitz et al. |
| 6,287,266 B1 | 9/2001 | Sandler et al. |
| 6,298,108 B1 | 10/2001 | Farawila |
| 6,343,107 B1 | 1/2002 | Erbes et al. |
| 6,668,034 B2 | 12/2003 | Mahe |
| 6,674,830 B2 | 1/2004 | Kato et al. |
| 6,768,781 B1 | 7/2004 | Moriarty |
| 6,888,910 B1 | 5/2005 | Moriarty |
| 7,445,760 B2 | 11/2008 | Fukasawa et al. |
| 7,521,007 B1 | 4/2009 | Jarvinen et al. |
| 7,711,079 B2 | 5/2010 | Oh et al. |
| 7,961,835 B2 | 6/2011 | Keller |
| 8,268,204 B2 | 9/2012 | Rhee et al. |
| 8,537,961 B2 | 9/2013 | Keller |
| 8,571,167 B2 | 10/2013 | Walters |
| 8,767,902 B2 | 7/2014 | Walters |
| 9,008,259 B2 | 4/2015 | Walters |
| 2001/0007584 A1 | 7/2001 | Adamson et al. |
| 2002/0052559 A1 | 5/2002 | Watrous |
| 2002/0117093 A1 | 8/2002 | Stamps |
| 2002/0156398 A1 | 10/2002 | Mansy et al. |
| 2005/0074083 A1 | 4/2005 | Haasbroek et al. |
| 2007/0217995 A1 | 9/2007 | Matsumura et al. |
| 2007/0280400 A1 | 12/2007 | Keller |
| 2007/0290178 A1 | 12/2007 | Baron et al. |
| 2008/0144762 A1 | 6/2008 | Holden et al. |
| 2009/0080586 A1 | 3/2009 | Yokoyama et al. |
| 2010/0008463 A1 | 1/2010 | Inatomi et al. |
| 2010/0239060 A1 | 9/2010 | Horie et al. |
| 2010/0303193 A1 | 12/2010 | Walters |
| 2011/0194666 A1 | 8/2011 | Walters |
| 2011/0206173 A1 | 8/2011 | Walters |
| 2014/0064432 A1 | 3/2014 | Walters |
| 2014/0321590 A1 | 10/2014 | Walters |
| 2015/0243378 A1 | 8/2015 | Walters |
| 2015/0294747 A1 | 10/2015 | Walters |

FOREIGN PATENT DOCUMENTS

| | | | |
|---|---|---|---|
| GB | 2234849 A | * 2/1991 | ............... G21D 5/02 |
| JP | 50014318 B | 5/1975 | |
| JP | S 54-33991 | 3/1979 | |
| JP | S 57-184510 | 11/1982 | |
| JP | S 59-83082 | 5/1984 | |
| JP | S 59-87696 | 6/1984 | |
| JP | S 59-087696 | 6/1984 | |
| JP | 60181694 A | 9/1985 | |
| JP | S 62-207995 | 9/1987 | |
| JP | S 63-3292 | 1/1988 | |
| JP | S 63-73191 | 4/1988 | |
| JP | S6473290 | 3/1989 | |
| JP | H01-187493 | 7/1989 | |

(56) References Cited

FOREIGN PATENT DOCUMENTS

| | | | |
|---|---|---|---|
| JP | 02184792 A | 7/1990 | |
| JP | H 03-075591 | 3/1991 | |
| JP | 4-216492 A * | 8/1992 | ............... G21C 1/02 |
| JP | H 04-270992 | 9/1992 | |
| JP | H 05-34479 | 2/1993 | |
| JP | H0552979 | 3/1993 | |
| JP | H 05-180968 | 7/1993 | |
| JP | 06194477 A | 7/1994 | |
| JP | H 06-324169 | 11/1994 | |
| JP | 07294676 A | 11/1995 | |
| JP | 09033687 A | 2/1997 | |
| JP | 09043389 A | 2/1997 | |
| JP | 09043391 A | 2/1997 | |
| JP | 09119994 A | 5/1997 | |
| JP | H 09-251088 | 9/1997 | |
| JP | H 10-170677 | 6/1998 | |
| JP | H 10-319169 | 12/1998 | |
| JP | H 11-326571 | 11/1999 | |
| JP | 2002-131459 | 5/2002 | |
| JP | 2002-181976 | 6/2002 | |
| JP | 2004-101199 | 4/2004 | |
| JP | 2005-232522 | 9/2005 | |
| JP | 2006-030001 | 2/2006 | |
| JP | 2006-226905 | 8/2006 | |
| JP | 2006-328260 | 12/2006 | |
| JP | 2007-291869 | 11/2007 | |
| JP | 2008170252 A | 7/2008 | |
| JP | 2009074960 | 4/2009 | |
| JP | 2010019793 | 1/2010 | |
| RU | 2124767 | 1/1999 | |
| RU | 2244347 | 1/2005 | |
| SU | 714505 A1 | 2/1980 | |
| SU | 1764783 | 9/1992 | |
| WO | WO-2010/141218 A1 | 12/2010 | |
| WO | WO-2011/088116 | 7/2011 | |
| WO | WO-2011/142869 A2 | 11/2011 | |
| WO | WO-2014/039641 | 3/2014 | |
| WO | WO-2015/160571 | 10/2015 | |

OTHER PUBLICATIONS

Emelaynov I.Ya. et al, "Designing nuclear reactors," Moscow, Energoisdat, 1982, p. 180. English Language translation provided.
Gol'din et al. "Project of Active Zone for the Reactor of BN-800 Type Operating Without of the Reactivity Margin Under Non-Intensive Control During Long Time," Math. Modelling, 2009; 21(10), pp. 76-84. English Language translation included.
International Search Report and Written Opinion for related application PCT/US15/24714, mailed Jul. 13, 2015.
Nuclear Power Technology Development, "Coordinated Research Project CRP 125001 Small Reactors without On-Site Refuelling (2004-2008)" International Atomic Energy Agency, [online], Updated on Oct. 15, 2008, pp. 1-12 [retrieved on Nov. 10, 2011]. Retrieved from the Internet: <URL: http://www.iaea.org/NuclearPower/SMR/crpi25001.html>.
In the U.S. Patent and Trademark Office, Notice of Allowance in re: U.S. Appl. No. 12/696,851 dated Aug. 22, 2013, 6 pages.
In the U.S. Patent and Trademark Office, Final Office Action in re: U.S. Appl. No. 12/696,851, dated Jun. 6, 2013, 8 pages.
In the U.S. Patent and Trademark Office, Office Action in re: U.S. Appl. No. 12/696,851, dated Dec. 21, 2012, 9 pages.
In the U.S. Patent and Trademark Office, Requirement for Restriction/Election in re: U.S. Appl. No. 12/696,851, dated Aug. 29, 2012, 9 pages.
In the U.S. Patent and Trademark Office, Final Office Action in re: U.S. Appl. No. 13/004,974, dated Mar. 13, 2014, 5 pages.
In the U.S. Patent and Trademark Office, Office Action in re: U.S. Appl. No. 13/004,974, dated Aug. 23, 2013, 9 pages.
In the U.S. Patent and Trademark Office, Notice of Allowance in re: U.S. Appl. No. 13/030,740, dated Mar. 14, 2014, 9 pages.
In the U.S. Patent and Trademark Office, Office Action in re: U.S. Appl. No. 13/030,740, dated Sep. 20, 2013, 5 pages.
In the U.S. Patent and Trademark Office, Notice of Allowance in re: U.S. Appl. No. 12/696,851, dated Aug. 22, 2013, 6 pages.
"Innovative small and medium sized reactors: Design features, safety approaches and R&D trends," *International Atomic Energy Agency*, [online], May 2005, pp. 1-214 [retrieved on Nov. 11, 2011) Retrieved from the Internet: <URL: http://www-pub.iaea.org/MTCD/publications/PDF/te_1451_web.pdf>.
Chang et al., "Small Modular Fast Reactor Design Description," *Argonne National Laboratory*, Jul. 2005, 194 pages.
Herrmann et al, "Electrolytic Reduction of Spent Nuclear Oxide Fuel as Part of an Integral Process to Separate and Recover Actinides from Fission Products," *Separation Science and Technology*, 41: pp. 1965-1983, (2006).
International Search Report and Written Opinion for related application PCT/US10/35412, mailed Aug. 31, 2010.
International Search Report and Written Opinion for related application PCT/US2011/020981, mailed Mar. 23, 2011.
International Search Report and Written Opinion for related International Application No. PCT/US2011/025455, dated Nov. 25, 2011, 11 pages.
Kadak et al., "Nuclear Power Plant Design Project: A Response to the Environmental and Economic Challenge of Global Warming Phase 1 Review of Options & Selection of Technology of Choice," *Massachusetts Institute of Technology Independent Activities Period*, [online], Jan. 1998, 56 pages [retrieved on Nov. 10, 2011] Retrieved from the Internet: <URL: http://web.mit.edu/pebble-bed/background.pdf>.
Kosaka et al, "A Study on Fission Products Removal by the Dry Pyrochemical Technique for the Fuel Decladding," *Proceedings of Global 2005*, paper 199, Tsukuba, Japan, Oct. 2005.
Nuclear Power Technology Development, "Coordinated Research Project CRP 125001 Small Reactors without On-Site Refuelling (2004-2008)" International Atomic Energy Agency, [online], Updated on Oct. 15, 2008, pp. 1-12 [retrieved on Nov. 10, 2011]. Retrieved from the Internet: <URL: http://www.iaea.org/NuclearPower/SMR/crpi25001 .html>.
Ogata et al., "Directions of Metal Fuel Development for Fast Reactors," *Proceedings of Global 2009*, paper 9135, Paris, France, pp. 1456-1464; Sep. 6-11, 2009.
Song et al, "Fractional Release Behavior of Volatile and Semivolatile Fission Products During a Voloxidation and OREOX Treatment of Spent PWR Fuel," *Nuclear Technology*; 162: 158-168, May 2008.
Thomas, "AIROX Nuclear Fuel Recycling and Waste Management," *Proceedings of Global 93*, 2: 722-728, Seattle WA, Sep. 1993.
International Search Report and Written Opinion for related application PCT/US16/14307, mailed Apr. 11, 2016.

* cited by examiner

SMALL, FAST NEUTRON SPECTRUM NUCLEAR POWER PLANT WITH A LONG REFUELING INTERVAL

CROSS-REFERENCE TO RELATED APPLICATIONS

This application is a continuation of U.S. patent application Ser. No. 13/030,740, filed Feb. 18, 2011, now U.S. Pat. No. 8,767,902 which claims priority to U.S. Provisional Patent Application No. 61/306,754, filed Feb. 22, 2010; the content of which is incorporated by reference herein in its entirety.

This application incorporates by reference in its entirety U.S. patent application Ser. No. 12/696,851, filed Jan. 29, 2010, now U.S. Pat. No. 8,571,167; the content of which is incorporated by reference herein in its entirety.

STATEMENT REGARDING FEDERALLY SPONSORED RESEARCH OR DEVELOPMENT

The Government has certain rights in the invention pursuant to Work for Others Agreement No. 854V0.

FIELD OF THE INVENTION

The present invention relates to nuclear power plants, and, more particularly, to fast neutron spectrum, sodium cooled reactors with metallic fuel.

BACKGROUND OF INVENTION

World electricity demand is expected to as much as double by 2030 and quadruple by 2050. The world electricity demand increase is forecasted to come from developed countries but to an even larger extent from developing countries. To meet rapid growth in developing countries, nuclear energy should be packaged in a configuration tailored to meet their specific needs.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

A fast neutron spectrum, sodium cooled reactor with metallic fuel is described.

Figure 1:
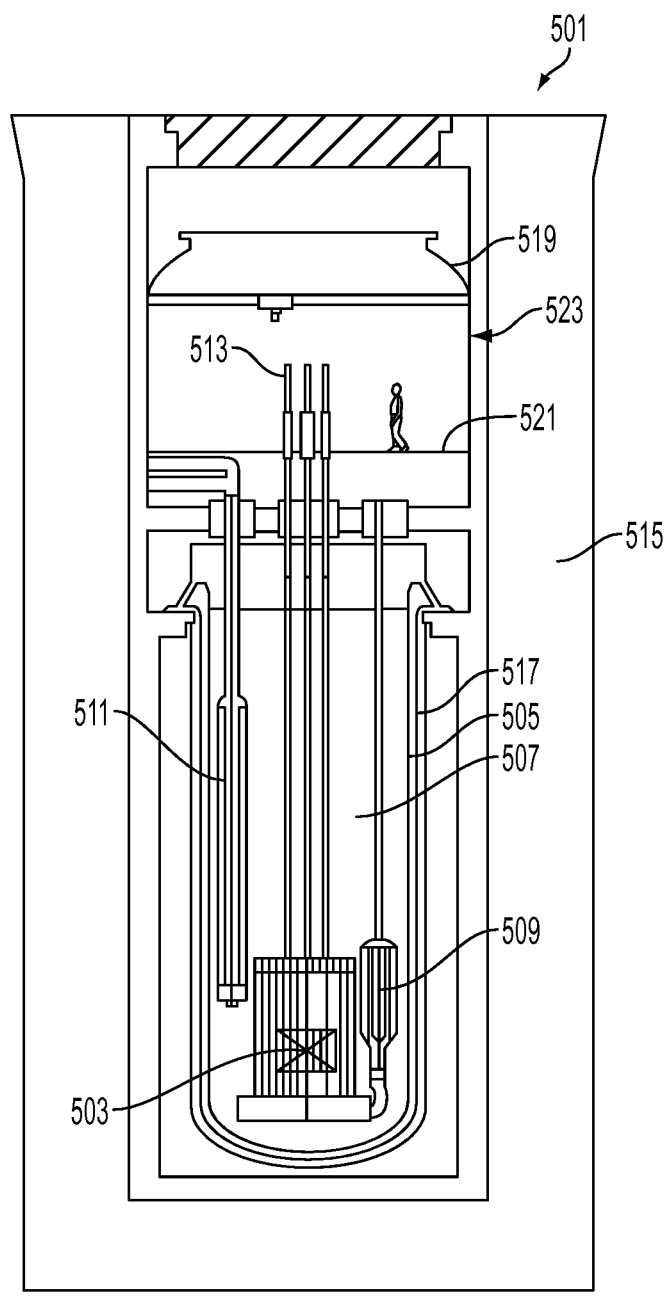
FIG. 1 shows an exemplary Small Modular Reactor ("SMR") according to an embodiment of the present invention.

FIG. 1 illustrates an exemplary Small Modular Reactor ("SMR") system 501 of the present invention. The SMR system may include a uranium-fueled core 503. The core composition may be enriched (<20%) uranium/zirconium alloy for the initial core and recycled uranium/transuranic zirconium for subsequent cores. Uranium 235/thoruim/zirconium alloys may also be used in some embodiments.

The core 503 may be submerged in a tank 505 of ambient pressure liquid sodium 507. The tank 505 may be thin-walled stainless steel, and may be sized for shipment by barge or rail. The tank 505 may be positioned in a guard vessel 517 and a deck 521 of the tank 505 that may be enclosed by a removable dome 519. The guard vessel 517 and dome 521 together may create a containment 523.

The SMR system 501 may be encased in a concrete silo 515. The core 503 and its containment 523 may be emplaced in a concrete silo with a concrete cover. The silo and its cover may create a shield structure to protect the reactor system 501 and the containment 523 from external hazards. The shield structure and/or the containment 523 and reactor 503 may be seismically isolated.

The SMR system 501 may also include control rods 513.

The liquid sodium 507 from the tank 505 may be pumped by one or more pumps 509 through the core 503 to carry heat away from the core 503. The liquid sodium 507 may carry the heat to one or more sodium to sodium heat exchangers 511. The liquid sodium 507 may be heated from about 350° Celsius to about 510° Celsius.

Figure 2:
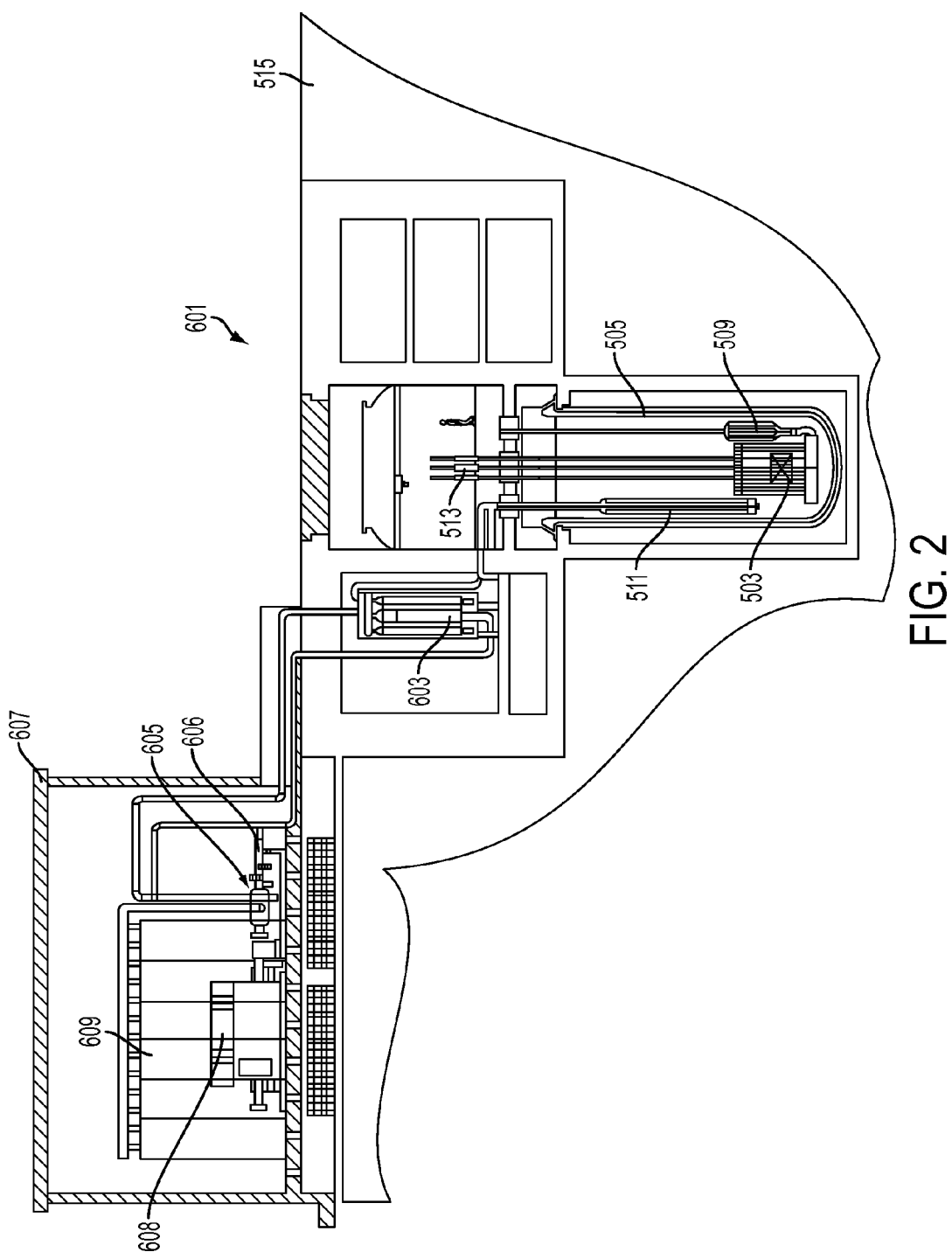
FIG. 2 is an example of an SMR nuclear power plant according to an embodiment of the present invention.

FIG. 2 shows the SMR system 501 within a larger energy generation system 601. The heated sodium 507 may pass through the heat exchanger 511 to heat secondary sodium, which in turn passes through a secondary heat exchanger 603 where the secondary sodium heats supercritical (almost liquid) carbon dioxide. The supercritical $CO_2$ is compressed to 21 MPa, just above its critical point at approximately 7 MPa and approximately 31° C. It is then recuperated to ~350° C. in regenerative heat exchangers 609; then further heated to ~500° C. in the Na-to-$CO_2$ heat exchanger. The recuperation and compression of a nearly-liquid fluid allow for an approximately 40% energy conversion at a relatively low temperature compared to ideal gas Brayton cycles. The heated supercritical carbon dioxide may then be used to spin a gas turbine 605 to make electricity in an electrical generator 608 in a carbon dioxide Brayton cycle building 607. The turbine 605 and compressor 606 rotating machinery is very compact owing to the high density of the $CO_2$. "Printed circuit" heat exchangers used for recuperations and for sodium to supercritical carbon dioxide heat exchange 603 are of extremely high power density. Altogether the supercritical $CO_2$ Brayton cycle is much more compact than comparable Rankine steam cycle energy converters. The Brayton cycle may provide the SMR a thermal efficiency (heat energy converted to electricity) of approximately 39% to approximately 41% or more, an efficiency much higher than conventional light water reactor ("LWR") steam driven turbines. Furthermore, in certain embodiments of the present invention waste heat can be used to meet lower-temperature needs, such as space heating, water desalination, industrial process heat, or can be dissipated through cooling towers.

Small sodium-cooled fast reactors may demonstrate important inherent safety characteristics. These reactors may operate with simplified, fail-safe controls that may facilitate rapid licensing by regulatory authorities. For example, in response to an accident condition, such as loss of coolant flow, overcooling in the heat exchanger, control rod runout or loss of ability to reject heat, embodiments of the reactor may shut themselves down without human or safety-system intervention. For instance, as the reactor coolant heats up, the core structures may thermally expand causing increased neutron leakage from the core, in turn causing power levels to decrease in a self-correcting fashion.

SMR operation requirements may be significantly simpler than conventional nuclear systems due to a characteristic that allows the reactor to innately follow load requirements brought upon by varying levels of electricity demand.

Metal alloy fuel is well demonstrated, both from performance and fabrication perspectives, and can straightforwardly meet long refueling time interval requirements. Additionally, a cermet fuel may be used, while the cermet fuel none-the-less retains metallic alloy fuel attributes.

The reactor core may have a long life, up to about 20 years or more. The reactor may not have or require permanent onsite refueling equipment or fuel storage capability. Refueling may be done by an outside service provider that brings refueling equipment with a new core, changes the core out, and takes both used core and refueling equipment away when completed. Fuel handling and shipping can commence at a very short time after reactor shutdown owing to the derated specific power (kwt/kg fuel). One or more multi-assembly clusters in a reactor core may have derated specific power (kwt/kg fuel) for enabling long refueling intervals while remaining in the existing fuels database. This may also enable refueling operations very shortly after reactor shutdown. Refueling operations may start within approximately two weeks of overall reactor shutdown, and may finish within approximately 1 month of overall reactor shutdown. The whole reactor core may be replaced at one time, about every 20 years. As such, the reactor system may have no requirement that the operator handle fuel. The overall unit may be sealed, physically and with electronic monitors, so that any intrusion attempt is easily detected. The elimination of any need or the ability to gain direct access to the fuel and use of smart monitoring systems not only reduces operator requirements, but also addresses proliferation concerns. Additionally, the SMR is small enough to be located below ground, which enhances containment and protection from terrorist activities. Finally, embodiments of the system are small enough that they can be shipped by barge, rail, and truck and installed at the site using modular construction techniques: this ability to remotely manufacture and obtain economies of serial production is a desirable benefit.

When the fuel cartridges are returned to the manufacturer/designer/fabricator's facility, nearly all of the used nuclear material can be recycled and used as fuel in future cartridges, greatly reducing the volume and radio-toxicity of the final waste to be stored in a geologic repository. Unlike used fuel from conventional light water reactors, material from SMR's need not be stored for tens of thousands of years. Non-recyclable materials from SMR's require only a few hundred years of storage before the waste decays to levels of radiation associated with the original uranium ore.

The reactor concept and its supporting fuel cycle infrastructure may offer a configuration of nuclear energy tailored to meet the needs of emerging electricity markets in developing countries as well as imminent global need for carbon-free non-electric energy sources. This configuration of nuclear energy may rely on the huge energy density of nuclear fuel ($>10^6$ times that of fossil fuel) to enable a distributed fleet of small fast reactors of long (20 year) refueling interval, providing local energy services supported by a small number of centralized facilities handling fuel supply and waste management for the entire fleet. The reactors may be sized for local and/or small grids, and are standardized, modularized and pre-licensed for factory fabrication and rapid site assembly. Correspondingly, the centralized fuel cycle infrastructure may be sized for economy of scale to support a large fleet of reactors in the region and may be operated under international safeguards oversight. The configuration is tailored to meet the tenets of sustainable development.

Figure 3:
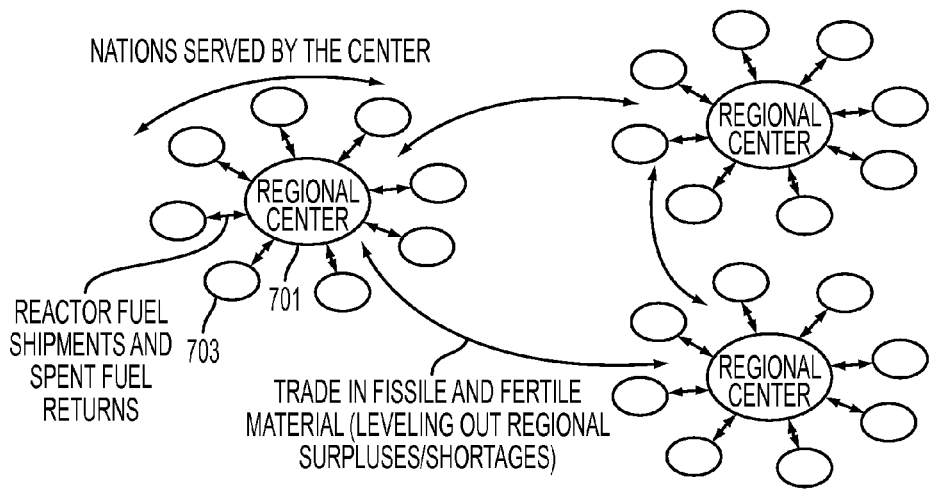
FIG. 3 shows an exemplary nuclear energy architecture according to an embodiment of the present invention.

FIG. 3 illustrates an exemplary nuclear energy infrastructure in its mature stage. A regional center 701 may supply/ship reactor fuel and/or accept spent fuel returns from sub-regions, such as countries 703. Various regional centers 701 may trade in fissile and fertile material to level out regional surpluses and/or shortages.

Reactor Overview

Embodiments of the present invention may include an approximately 50 $MW_e$ (125 $MW_t$) to approximately 100 $MW_e$ (260 $MW_t$) sodium-cooled fast reactor operating on a long (approximately 15 to approximately 20 year) whole core refueling interval. An initial fuel load may be enriched uranium (≤20% enriched) in the form of metal alloy fuel slugs, sodium or helium bonded to ferritic-martinsitic cladding. The reactor may exhibit an internal breeding ratio near unity such that its reactivity burnup swing is small and its core is fissile self-sufficient. A burnup swing of less than approximately 1% Δk/k may facilitate passive safety and passive load follow. Embodiments of the present invention may attain 80 $MW_t$d/kg or more fuel average burnup, and upon pyrometallurgical recycle at completion of its 20 year burn cycle, depleted uranium makeup feedstock may be all that is required for the reload core. Upon multiple recycles, the core composition may gradually shift to an equilibrium transuranic fuel composition, which is also fissile self sufficient, and thus requiring only U238 makeup upon recycle.

A forced circulation heat source reactor may deliver heat at ~500° C. through a sodium intermediate loop that drives a supercritical $CO_2$ (S—$CO_2$) Brayton Cycle power converter attaining ~40% conversion efficiency and may be capable of incorporating bottoming cycles for desalination, district heat, etc. Other embodiments might drive a Rankine steam cycle. Embodiments of the present invention may employ passive decay heat removal; achieve passive safety response to Anticipated Transients Without Scram (ATWS); and employ passive load follow. The balance of plant may have no nuclear safety function.

The plant may be sized to permit factory fabrication of rail and barge shippable modules for rapid assembly at the site. Embodiments of the present invention may have features targeted to meet infrastructure and institutional needs of rapidly growing cities in the developing world as well as non-electric industrial and/or municipal niche applications in all nations.

Targeting Emerging Markets

Nuclear energy is a well-established industrial business that, over the past 35 years, has attained 13,000 reactor years of operating experience and 16% market share of world electricity supply. Nuclear energy is being deployed primarily in the form of large size (greater than or approximately equal to 1200 $MW_e$) plants in industrialized nations. There are currently 436 reactors deployed in 30 countries. Future growth in nuclear deployments is projected to be as much as 66% or even 100% additional capacity by 2030. The majority of the growth is projected to take place in developing countries where institutional and infrastructure conditions often differ from those that, in the past, favored large scale plants and a once through fuel cycle. Developing nations often have small, local grids of under a few tens of GW, which are unable to accommodate a 1.2 to 1.5 $GW_e$ sized plant. Embodiments of the present invention operating at 100 MW$_e$, are not only compatible with smaller grid size but additionally, the smaller capital outlay required for its installation is compatible with a developing country's necessity for sharing limited financing across multiple development projects during the early decades of its rapid economic growth.

A twenty year refueling interval with fuel supply, recycle, and waste management services outsourced to a regional center enable a nation to attain unprecedented energy security even absent a need to first emplace a complete indigenous fuel cycle/waste management infrastructure. Moreover, centralization of fuel cycle facilities for economy of scale in technical and institutional safeguards operations may facilitate an international nonproliferation regime even for widespread worldwide deployment of nuclear-based energy supply.

The energy supply growth rate in industrialized countries is projected to be slower than in developing countries. Nonetheless, new nuclear plants are needed for replacements of coal and nuclear plants as they are decommissioned at end of life. The large capacity interconnected grids in industrialized nations are compatible with large power rating plants. Niche markets, however, are expected to rapidly emerge in both developed and developing nations for non-electric and/or cogeneration applications of carbon-emission-free nuclear energy. Among these markets may be water desalination, oil sands/oil shale recovery and upgrading, and coal or bio to liquids synthetic fuel production. Passive safety posture precludes any safety function being assigned to the balance of plant and along with the reactor's reduced source term favor siting adjacent to industrial and municipal installations.

Features of the Fuel Cycle

First, the core power density (kw$_t$/liter) and fuel specific power kw$_t$/kg fuel may be derated so as to achieve a 20 year refueling interval while remaining within the bounds of the established metallic alloy fuels experimental database. This may provide a client long term energy security and a high level of reliable availability.

Second, the once in 20 year whole-core refueling may be conducted by factory personnel who bring the refueling equipment and fresh fuel from offsite, conduct the refueling operations, and then return the used core and the refueling equipment to the factory. This may provide the client a way to attain energy security absent a prior need to emplace indigenous facilities for enrichment, fuel fabrication, reprocessing, and waste repositories.

Figure 4:
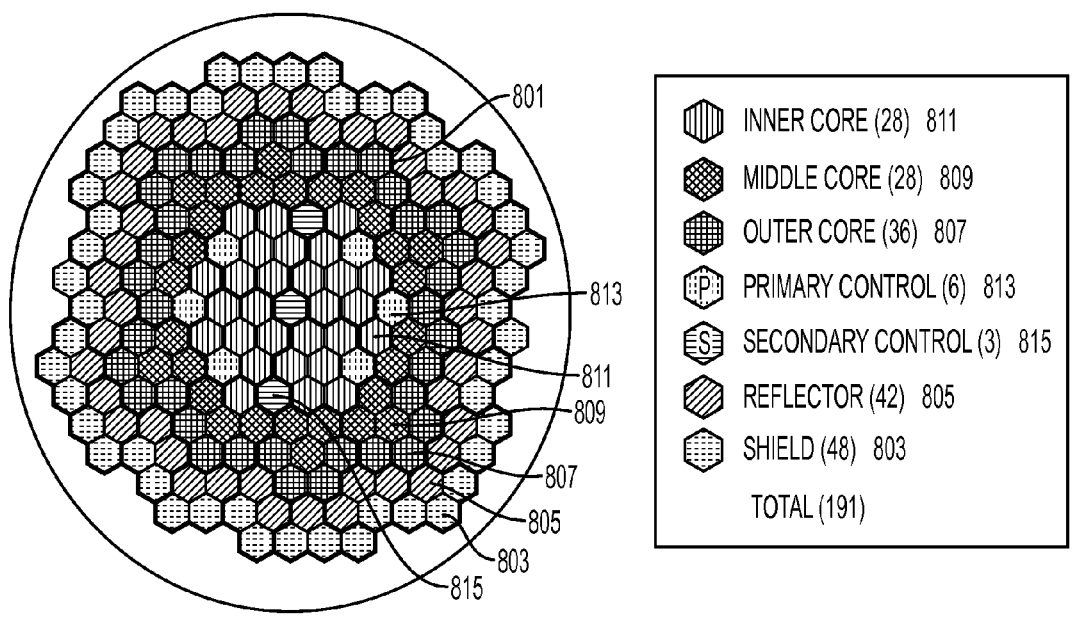
FIG. 4 shows an exemplary refueling cluster layout and core radial enrichment zoning according to an embodiment of the present invention.

Third, the refueling operations may be done on the basis of a fuel handing assembly that may include multiple sub-components. Various numbers of sub-components may be included and may or may not be clustered. As an example, see an exemplary core made of seven fuel assembly clusters 801 in FIG. 4. FIG. 4 shows an exemplary arrangement of core components. For example, an outer layer of shield assemblies 803 may cover a layer of reflector 805, which may cover a layer of outer core 807. Middle core 809 of a lower enrichment may generally surround inner core 811 of still lower enrichment with primary control 813 and secondary control 815 assemblies placed within the core 801. As shown, the fuel, reflector, shield and control rod assemblies are grouped into seven-assembly clusters to speed the rate of core refueling.

During operations, the seven-assembly cluster may be transferred after a very short cooling period following reactor shutdown so as to minimally interrupt energy supply availability. The short cooling period and seven-assembly cluster features may be possible due to the derated fuel specific heat (kw$_t$/kg fuel).

Fourth, the first fuel loading may be enriched uranium (enrichment<20%) and the core may be fissile self-sufficient such that at the end of the 20 year operation interval, the core contains as much bred-in fissionable content as has been burned out. Upon pyrometallurgical recycle of the used core, only U238 feedstock and fresh cladding may be required for refabrication of a replacement core.

Fifth, over multiple recycles, the composition of the core may gradually transition from a U235-rich composition towards an equilibrium transuranic-rich composition that is also fissile self sufficient. The fuel cycle waste stream may exclusively include fission products, which require only 200 to 300 years of sequestration before decaying to background levels of radioactivity, whereas all transuranics may be returned to the reactor as fuel where they are converted to fission products.

Sixth, after the first core loading, all subsequent cores may require only U238 as feedstock. This may extend the world's ore resource potential to nearly 100% productive use, and yielding at least a millennium of energy supply. Capability to use thorium-based metallic alloy fuel extends the world's resource base to multi millennia.

Seventh, the fuel fabrication technology may offer the option of incorporating LWR used fuel crushed oxide particles onto a metallic alloy to form a cermet. This option, when combined with an added (oxide reduction) step in the pyrometallurgical recycle process may offer a route to cost effective management of LWR used fuel by subsuming it into the fast reactor closed fuel cycle.

Features of a Heat Source Reactor

First, a core layout may include assembly clusters of individually ducted and orifaced fuel assemblies. As described above, see FIG. 4 for exemplary seven-assembly clusters in a core layout. In other embodiments, other numbers and arrangements may be contemplated. The assemblies may be grouped into clusters for fuel handling while preserving individual fuel assemblies so as to retain the orificing and the limited free bow reactivity feedback characteristics. Replaceable reflector and shield assemblies may be grouped into 3 or 4 assembly clusters.

Figure 5A:
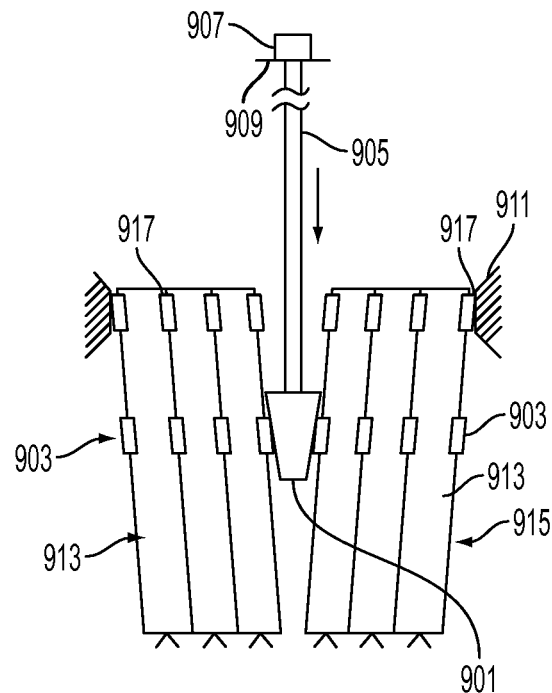
FIGS. 5A-5B show an exemplary wedge used for core clamping and unclamping during refueling operations.
Figure 5B:
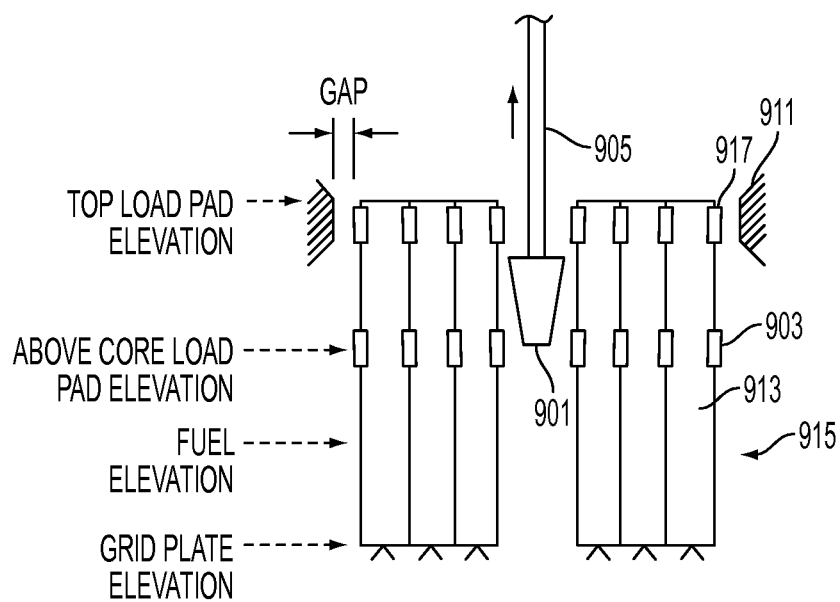

Second, a "limited free bow" core clamping approach may be used. The clamping approach may utilize a removable and vertically adjustable horizontal wedge 901 located in a central assembly position of a core layout of ducted fuel assemblies 913 at an elevation approximately at above-core load pads 903, as shown in FIG. 5A. Note that radial displacement as shown in FIGS. 5A and 5B is exaggerated. The wedge 901 may be attached to a driveline 905 coupled to a vertical positioning mechanism 907 on a reactor deck 909. Preferably, the wedge 901 is at a lower end of the driveline 905, where the driveline 905 is in a vertical orientation. The wedge 901 can be removed/withdrawn to loosen the core for fuel handling, as shown in FIG. 5B. The wedge 901 can be re-inserted to clamp the core 915 and top load pads 917 outward against a core former ring 911 at a top load pad elevation once refueling is completed. Preferably the top load pads 917 may surround one or more ducted fuel assemblies 913 at approximately a top end of the ducted fuel assemblies 913. The above-core load pads 903 may surround one or more ducted fuel assemblies 913 above a fuel elevation, but below the top load pads 917. A grid plate elevation may approximately correspond with a bottom end of the ducted fuel assemblies 913.

Third, a core may retain performance parameters, both operational and safety, even as the fuel composition evolves over the 20 year burn cycle and further evolves from one recycle loading to another.

Figure 6A:
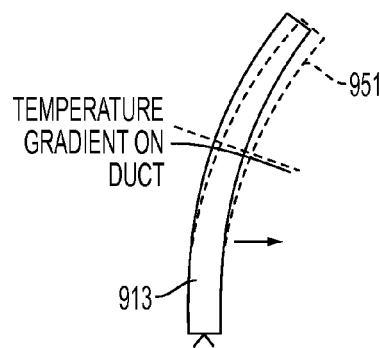
FIGS. 6A-6C show an exemplary wedge used for enhancing core radial expansion reactivity feedback.
Figure 6B:
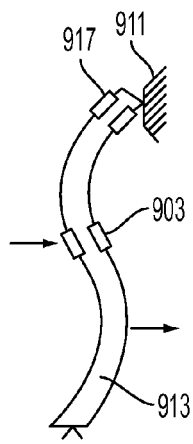
Figure 6C:
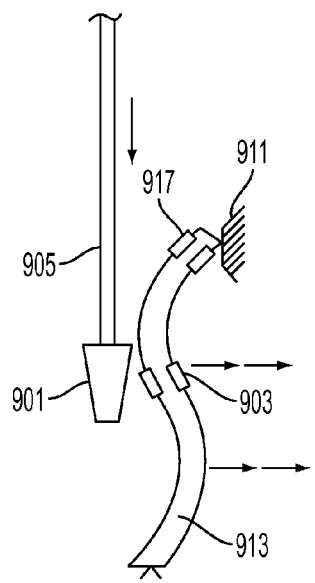

Fourth, embodiments of the present invention may include a strategy to monitor reactivity feedbacks throughout core life and to fine-tune their values using the vertical position adjustment of the wedge, should they drift as the core ages over its 20 year burn cycle. The integral reactivity feedbacks may be measured in situ by non-intrusive small adjustments of coolant flow rate, inlet coolant temperature, and control rod position. The rest position of the core clamping wedge 901 may be used to adjust the value of a core radial expansion component of the inherently negative power coefficient of reactivity, as shown in FIGS. 6A-6C. Note that radial displacement as shown in FIGS. 6A-6C is exaggerated. As shown in FIG. 6A, increasing power may increase outward (towards the right in FIGS. 6A-6C) bowing 951 of fuel assemblies 913. Unrestrained flowering upon an increase in core power may result from an increase a radial thermal gradient on the ducted fuel assemblies 913. Inboard ducted fuel assemblies 913 may push outward, as shown in FIG. 6B. Limited free bow core restraint may enhance radial dilation at fuel zone elevation of ducted fuel assemblies 913. As shown in FIG. 6C, an increase in coolant outlet temperature may bathe the wedge driveline 905 with increased temperature such that the driveline's thermal expansion may drive the wedge 901 downward/deeper. This may in turn amplify the radially outward bowing of core fuel assemblies 913 at a fuel zone elevation, which then may increase axial leakage and reduce reactivity. By adjusting a rest position of the wedge 901 at full power and full flow, the amplitude of the bowing enhancement can be fine tuned.

Fifth, a passive safety response may be provided for loss of flow, loss of heat sink, chilled coolant inlet temperature and single rod runout transient overpower (ATWS) transient initiators without scram. The innate reactivity feedbacks with respect to power and fuel and coolant temperatures, when combined with a nearly zero reactivity burnup swing and with natural circulation capability at decay heat levels, may take the reactor to an undamaged safe state for all ATWS initiators, i.e., no damage may be incurred and a stable state may be reached for these initiators even if the rods fail to scram.

Sixth, a passive decay heat removal channel may be provided to the ambient atmosphere ultimate heat sink always operating as a backup to active decay heat removal channels. The passive channel may always be operating at less than or approximately equal to 1% full power and can be confirmed to be functioning at all stages of core life by in situ non-intrusive measurements. The heat capacity of the core and internal structure is sufficient to safely absorb the initial transient of decay heat in excess of the passive channels' capacity.

Features of a Power Plant

First, a heat source reactor driving a S—$CO_2$ Brayton cycle energy converter may attain nearly 40% or more heat to electricity conversion efficiency while operating in the working fluid range of ~500° C., 21 MPa to 31° C., ~7 MPa. This converter may use rotating machinery of extraordinarily high power density and recuperative heat exchangers of exceptionally high power density.

Second, a heat source reactor may passively load follow the energy converter demand for heat. The reactor may sense the balance of plant demand communicated via flow rate and return temperature of the intermediate heat transport loop. The reactor's innate reactivity feedbacks may maintain heat production in balance with heat removal through the intermediate loop within tens of seconds and without need for active adjustments of control rods.

Third, a Balance of Plant (BOP) may be provided that carries no nuclear safety function and can be built, operated and maintained to normal industrial standards. The reactor can passively accommodate all physically attainable combinations of flow rate and return temperature returning from the BOP through the intermediate heat transport loop. The passive decay heat removal channel may have no dependence on the BOP, and the nearly zero burnup control swing makes a rod runout TOP resulting from a control system error a no damage event. So the BOP need not carry any nuclear safety function.

Fourth, embodiments of the present invention may include a potential to tie a broad diversity of BOP configurations to a standard, pre-licensed heat source reactor since the BOP carries no nuclear safety function. The S—$CO_2$ Brayton cycle may reject ~60% of supplied heat and may do so between ~100° C. and 31° C. Many cogeneration options may exist for such a temperature range, including multi-effect distillation desalinization; district heat; district chilled water; ice production and others. Alternately, diverse non-electric industrial processes may be co-sited closely with the heat source reactor, given its self-protection features, small source term, passive load following feature, and high level of availability.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A nuclear reactor system comprising:
   a reactor comprising:
      a reactor tank;
      a reactor core within the reactor tank, the reactor core comprising a fuel column of metal or cermet fuel using liquid sodium as a heat transfer medium; and
      a pump for circulating the liquid sodium through a heat exchanger; and
   at least one passive safety system comprising reactivity feedbacks;
   at least one passive load follow system; and
   wherein the system produces approximately 50 $MW_e$ to approximately 100 $MW_e$.

2. The nuclear reactor system of claim 1, further comprising a heat source reactor driving a supercritical $CO_2$ Brayton cycle energy converter.

3. The nuclear reactor system of claim 2, wherein the energy converter has a conversion efficiency of approximately 39% to approximately 41%.

4. The nuclear reactor system of claim 1, further comprising a heat source reactor driving a Rankine steam cycle.

5. The nuclear reactor system of claim 1, further comprising bottoming cycles for cogeneration.

6. The nuclear reactor system of claim 1, further comprising a balance of plant with no nuclear safety function.

7. The nuclear reactor system of claim 1, wherein the reactor tank comprises thin walled stainless steel.

8. The nuclear reactor system of claim 1, wherein the reactor tank is positioned in a guard vessel.

9. The nuclear reactor system of claim 8, wherein the reactor tank further comprises a deck, and wherein at least the deck is enclosed by a removable dome.

10. The nuclear reactor system of claim 9, wherein the guard vessel and the removable dome form a containment structure.

11. The nuclear reactor system of claim 10, wherein the containment structure is emplaced in a silo shield structure with seismic isolation.

12. The nuclear reactor system of claim 1, wherein the reactor core comprises enriched uranium/zirconium alloy for an initial core.

13. The nuclear reactor system of claim 1, wherein the reactor core comprises recycled uranium/transuranic zirconium for refueling cores.

14. The nuclear reactor system of claim 1, wherein the reactor core comprises one or more multi-assembly clusters.

15. The nuclear reactor system of claim 14, wherein the one or more multi-assembly clusters have derated specific power (kwt/kg fuel) for enabling long refueling intervals and enabling refueling operations to begin approximately two weeks after reactor shutdown.

16. The nuclear reactor system of claim 1, wherein the system comprises a burnup swing of less than approximately 1% $\Delta k/k$.

17. The nuclear reactor system of claim 1, wherein the at least one passive safety system comprises a passive decay heat removal channel.

18. The nuclear reactor system of claim 17, wherein the passive decay heat removal channel operates at less than or approximately equal to 1% full power.

19. The nuclear reactor system of claim 1, wherein the at least one passive safety system relate to power characteristics, fuel characteristics, and coolant temperatures.

20. The nuclear reactor system of claim 1, wherein the at least one passive load follow system comprises sensing balance of plant demand communicated via flow rate and return temperature of a heat transport loop.

21. The nuclear reactor system of claim 1, wherein the system produces approximately 100 $MW_e$.

22. A method for providing nuclear energy, the method comprising:
providing a nuclear reactor system, the system comprising:
a reactor comprising:
a reactor tank;
a reactor core within the reactor tank, the reactor core comprising a fuel column of metal or cermet fuel using liquid sodium as a heat transfer medium; and
a pump for circulating the liquid sodium through a heat exchanger;
at least one passive safety system comprising reactivity feedbacks; and
at least one passive load follow system;
initiating the nuclear reactor system;
converting heat to electricity; and
supplying the electricity, and
wherein the system produces approximately 50 $MW_e$ to approximately 100 $MW_e$.

23. The method of claim 22, further comprising a balance of plant with no nuclear safety function.

24. The method of claim 22, wherein the at least one passive safety system comprises a passive decay heat removal channel.

25. The method of claim 22, wherein the at least one passive load follow system comprises sensing balance of plant demand communicated via flow rate and return temperature of a heat transport loop.

* * * * *